J. B. MORRISON.
Whiffletree.
No. 59,053.
Patented Oct 23, 1866.
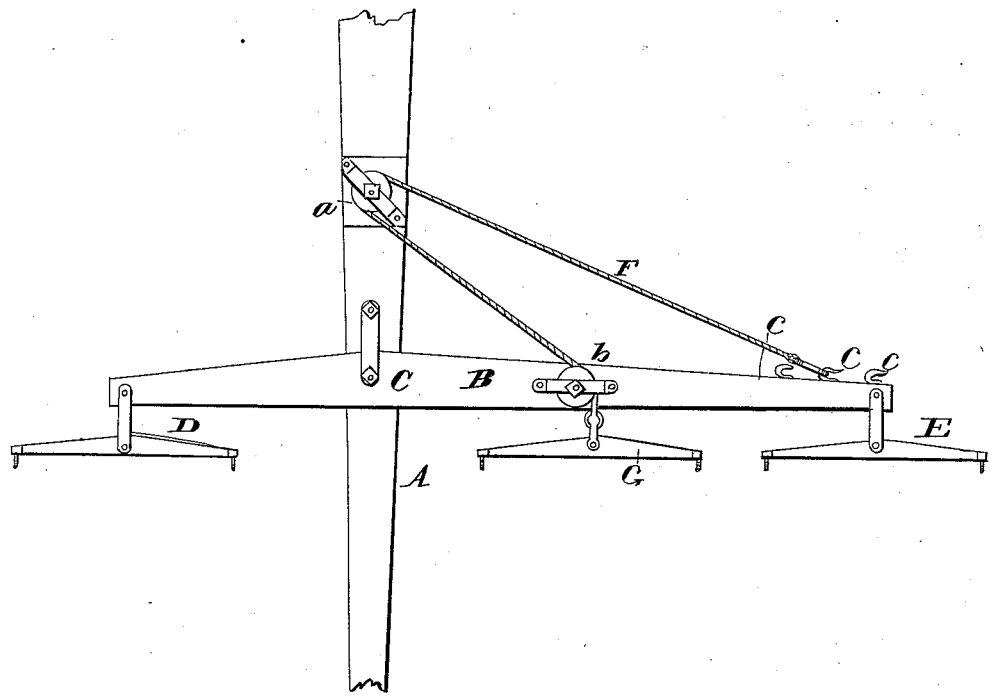
Witnesses;
Inventor;

UNITED STATES PATENT OFFICE.

J. B. MORRISON, OF FORT MADISON, IOWA.

IMPROVEMENT IN THREE-HORSE SPLINTER-BARS.

Specification forming part of Letters Patent No. 59,053, dated October 23, 1866.

*To all whom it may concern:*

Be it known that I, J. B. MORRISON, of Fort Madison, in the county of Lee and State of Iowa, have invented a new and Improved Triple-Tree or Three-Horse Splinter-Bar; and I do hereby declare that the following is a full, clear, and exact description thereof, which will enable those skilled in the art to make and use the same, reference being had to the accompanying drawing, forming part of this specification.

The drawing represents a plan or top view of my invention.

This invention relates to a new and improved triple-tree or three-horse splinter-bar; and consists in a novel arrangement of parts, whereby the draft of three horses attached thereto is equalized and the device rendered capable of being adjusted to suit horses of different sizes or varying powers of draft.

A represents the draft-pole, to which my invention is applied. B represents a splinter-bar, which is attached to the draft-pole by a bolt, C, which passes through B at one side of its center, so as to leave about one-third of the length of B projecting beyond one side of the draft-pole, and the other two-thirds projecting beyond the other side, as shown in the drawing.

D represents a whiffletree attached to the end of the short arm of B, and E a whiffletree attached to the end of the long arm of the same; and it will, of course, be seen that a horse attached to E will have, so far as its action upon B is concerned, just double the power of one attached to D, owing to the increased leverage of the long arm of B.

F represents a strap, cord, or chain, one end of which is attached to the long arm of B, and passes around a pulley, $a$, on the draft-pole, and around a pulley, $b$, on the long arm of B, and has a whiffletree, G, attached to its opposite end, as shown clearly in the drawing.

The long arm of the splinter-bar therefore has two horses attached to it, and the short arm one horse only attached; but the two horses which are attached to the whiffletrees E G have their draft equalized, owing to the strap, cord, or chain F, the draft of the horse attached to G being against the one attached to E, so that the two horses which are attached to the long arm of the splinter-bar will not act against the one attached to the short arm, each animal doing his share of the work, and the draft distributed equally between the three horses.

The rear side of the splinter-bar B, at its long arm, has a plurality of hooks, $c$, attached for the strap, cord, or chain F to be fastened to, so as to compensate for the variation in the size and strength of horses.

If a powerful horse is attached to whiffletree G, the strap, cord, or chain should be fastened to the innermost hook $c$, and if a light or weak horse be attached to G, F should be fastened to the outermost hook $c$.

Thus, by this simple means, a triple-tree or three-horse splinter-bar is obtained in which the draft of the three horses will be equalized, equally so as the draft of two horses attached at equal distances from the center of an ordinary double-tree.

Having thus described my invention, I claim as new and desire to secure by Letters Patent—

The strap, cord, or chain F, with whiffletree G attached and applied to the splinter-bar B, and draft-pole A, as shown, when said strap, cord, or chain is used in connection or combination with the whiffletrees D E, attached to the splinter-bar B, and the latter secured to the draft-pole one-third the distance of its length out of center, substantially as shown and described.

J. B. MORRISON.

Witnesses:
JONAS A. EATON,
M. A. THURSTON.